United States Patent
Varga

(10) Patent No.: US 7,422,273 B2
(45) Date of Patent: Sep. 9, 2008

(54) INSULATED VENT CAP

(76) Inventor: Ambrus Laszlo Varga, 1235 Hartman Road, Kelowna, British Columbia (CA) V1P 1B6

( * ) Notice: Subject to any disclaimer, the term of this patent is extended or adjusted under 35 U.S.C. 154(b) by 334 days.

(21) Appl. No.: 11/429,074

(22) Filed: May 8, 2006

(65) Prior Publication Data

US 2007/0024094 A1 Feb. 1, 2007

Related U.S. Application Data

(60) Provisional application No. 60/687,303, filed on Jun. 6, 2005.

(51) Int. Cl.
*B60R 27/00* (2006.01)
(52) U.S. Cl. .................. 296/210; 454/136; 454/367
(58) Field of Classification Search ............. 296/210; 454/94, 136, 367
See application file for complete search history.

(56) References Cited

U.S. PATENT DOCUMENTS

| | | | |
|---|---|---|---|
| 3,934,383 A | 1/1976 | Perry et al. | |
| 3,984,947 A | 10/1976 | Patry | |
| 4,045,922 A | 9/1977 | Elliott | |
| 4,106,399 A | 8/1978 | Lawrence, Jr. | |
| 4,130,966 A | 12/1978 | Kujawa, Jr. et al. | |
| 4,196,657 A | 4/1980 | Crongeyer et al. | |
| 4,201,122 A | 5/1980 | Maciag | |
| 4,592,269 A | 6/1986 | Lamparter | |
| 4,615,263 A | 10/1986 | Titterud | |
| 4,759,270 A | 7/1988 | Lindeen | |
| 5,054,377 A | 10/1991 | Mochel et al. | |
| 6,106,385 A | 8/2000 | Humphrey et al. | |
| 6,155,008 A | 12/2000 | McKee | |
| 6,468,147 B1 | 10/2002 | Thomas | |
| 6,758,741 B2 | 7/2004 | Aoki et al. | |
| 2003/0162490 A1 | 8/2003 | Klesing et al. | |
| 2005/0003751 A1 | 1/2005 | Thomas | |
| 2005/0055901 A1 | 3/2005 | Valentz et al. | |

*Primary Examiner*—Lori L Lyjak
(74) *Attorney, Agent, or Firm*—Antony C. Edwards

(57) ABSTRACT

An insulated vent cap includes a cover member having a circumferential rim extending around corresponding circumferential edges of both a substantially rigid cover sheet and a substantially rigid base sheet, wherein the base sheet is spaced apart from, and below, the cover sheet, to thereby define a sealed, air-tight insulating void there-between. A spacer extends from the coversheet to the base sheet, whereby the cover and base sheets are maintained spaced apart to maintain the insulated void or space between the cover and base sheets irregardless of ambient temperatures external and internal to the vent on an enclosure to which the vent cap is mounted.

20 Claims, 6 Drawing Sheets

INSULATED VENT CAP

CROSS-REFERENCE TO RELATED APPLICATION

This application claims priority from U.S. Provisional Patent Application No. 60/687,303 filed Jun. 6, 2005 entitled Recreational Vehicle Thermal Pane Vent Cap and Method.

FIELD OF THE INVENTION

This invention relates to the field of vent caps such as employed to cover air vents formed in the roofs of recreational vehicles such as camper trailers and the like, and in particular to an insulated vent cap well adapted for such a use.

BACKGROUND OF THE INVENTION

Without intending to limit the uses to which the present invention may be put, by way of example, applicant is aware of the present use of vent caps which are typically mounted on hinges onto the roofs of recreational vehicles such as camper trailers to selectively cover apertures formed in those roofs which serve as air vents providing circulation into the interior of the enclosure. Such prior art vent caps afford a relatively simple mechanism for the exchange of air from within the enclosure of the recreational vehicle so as to typically provide cooling. Quite often a mechanical hand crank is mounted into the frame supporting the vent cap so that a user may simply turn the hand crank to either open or close the vent cap over the air vent.

Such prior art air vents are, in applicant's experience, typically made of simply a single layer of for example plastic which provides very little insulation when, as is quite often the case, the outside temperature is sufficiently cool so that it is desirable to close the vent cap and heat the enclosure. For recreational vehicles, such a temperature differential will cause condensation on the inside of the vent cap, which may lead to roof rot, that is, by minimizing condensation, water will not penetrate the inside substructure of the recreational vehicle and promote roof decay. Further, heating the enclosure will often mean using up reservoirs of gaseous fuel carried on the exterior of the recreational vehicle such as in propane tanks. Consequently, in order to, minimize condensation and to preserve the fuel reserves, it is desirable to provide as much insulation in the vent cap as is economically feasible for the recreational vehicle. In the converse case quite often the outside temperature is greater than the inside temperature. For this situation a recreational vehicle is often equipped with air conditioning. In such instances, opening the vent cap will not cool the interior of the recreational vehicle because the outside temperature is hot, even at night, and so using air conditioning is often the only viable alternative to provide comfort within the enclosure of the recreational vehicle. Thus, again, it is advantageous to provide an insulated vent cap so as to minimize the heating of the air in the enclosure by heat transfer through the vent cap from the exterior of the recreational vehicle.

SUMMARY OF THE INVENTION

The insulated vent cap of the present invention may be characterized in one aspect as including a cover member having a circumferential rim extending around corresponding circumferential edges of both a substantially rigid cover sheet and a substantially rigid base sheet, wherein the base sheet is spaced apart from, and below, the cover sheet to thereby define a sealed, air-tight insulating void therebetween. A spacer extends from the cover sheet to the base sheet, whereby the cover and base sheets are maintained spaced apart. The spacer is positioned so as to support the sheets at least substantially medially between the outer edges of the circumferential rim. The spacer may be rigid or resilient. The cover sheet or both the cover and base sheets may be flat or domed or of other shape, such shape not intended to be limiting.

In one embodiment the corresponding circumferential edges of the base and cover sheets are coterminous substantially adjacent the circumferential rim. In embodiments where the vent cap is domed, the cover sheet may include a first domed surface and the base sheet may include a second domed surface. In such embodiments, the first and second domed surfaces may be substantially parallel to each other so that the void has a substantially constant dimension measured orthogonally between the cover and base sheets. Similarly, in other embodiments, for any given shape of the base and cover sheets, advantageously they remain substantially parallel to one another or otherwise provide an air gap or void therebetween to provide an insulating space.

The dome of the base and cover sheets may be formed so as to include on each a substantially pyramid shape on and over the rim. The pyramid shapes may be centred over the rim and may be a right square pyramids.

A spacer may be formed between the cover and base sheets. In one embodiment not intended to be limiting, the space includes a cup extending between the cover and base sheets. The cup may be located at the apex of the pyramid shapes. The cup may be hollow and may have either an upwardly or downwardly disposed opening into the cup. The cup or other spacers such as radial flanges, arm, partitions, walls, ribs, pins or other rigid or semi-rigid formations, which may be formed or extruded, may be formed as an integral part of either one of, or both of, the base and cover sheets.

DETAILED DESCRIPTION OF EMBODIMENTS OF THE INVENTION

Figure 1:
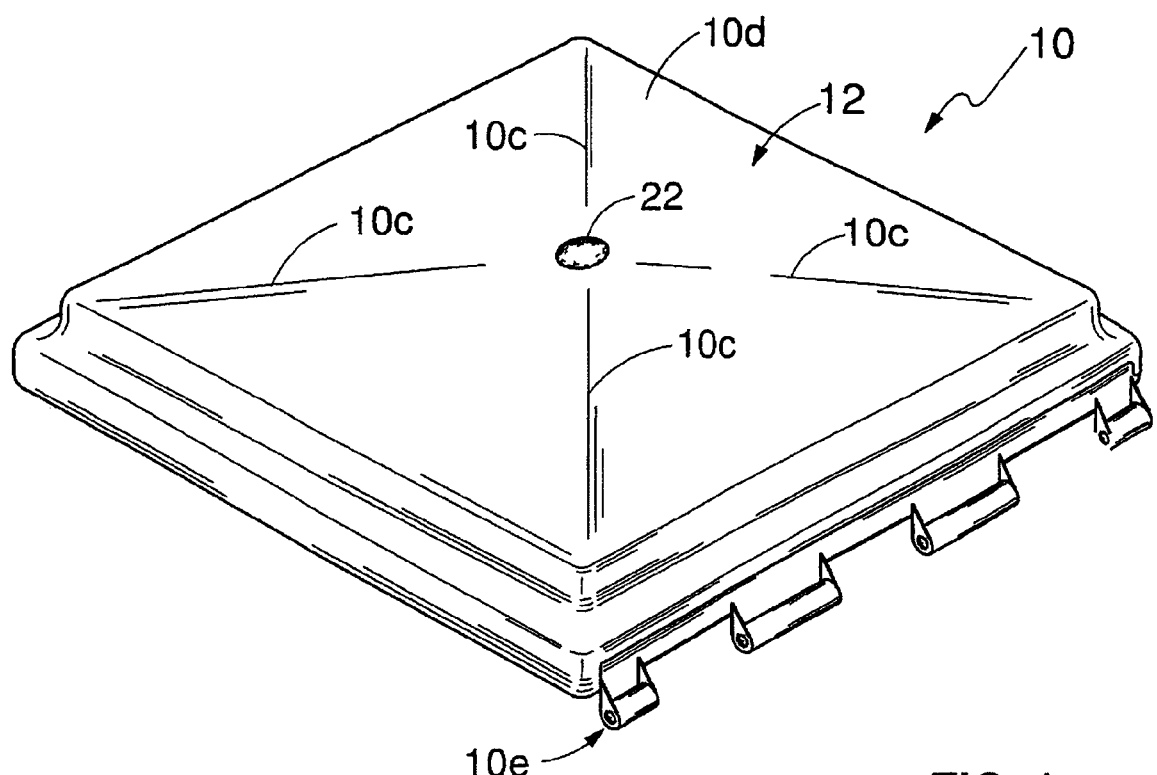
FIG. 1 is in perspective view, one embodiment of the insulated vent cap according to the present invention.
Figure 2:
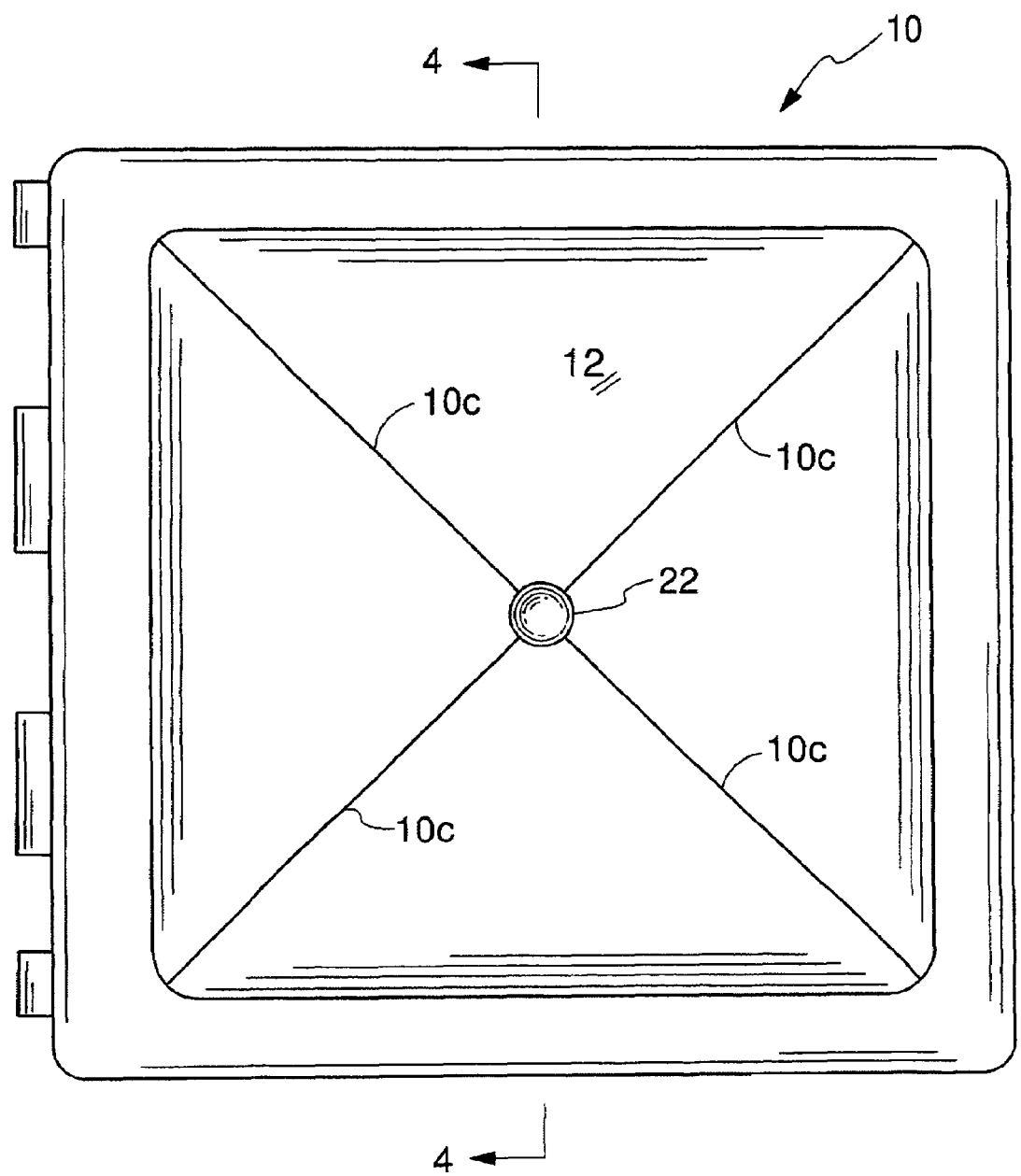
FIG. 2 is, in plan view, the vent cap of FIG. 1.
Figure 3:
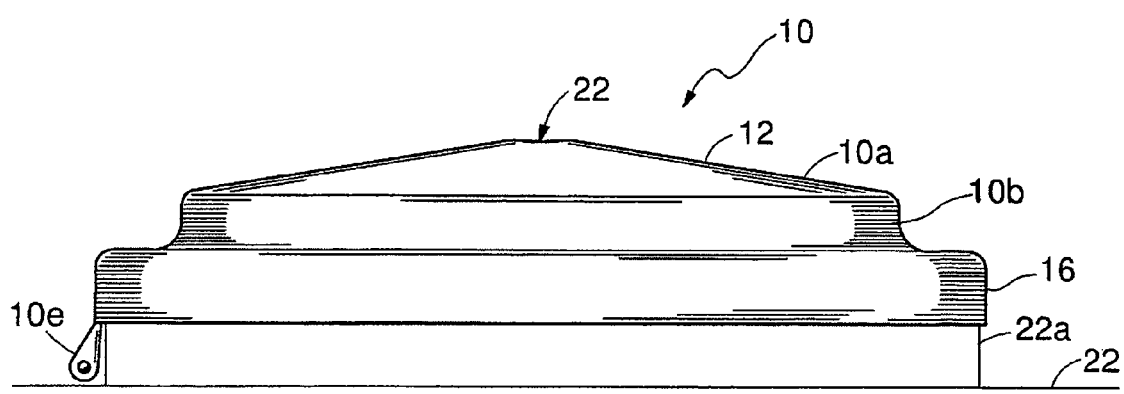
FIG. 3 is, in side elevation view, the vent cap of FIG. 1.
Figure 4:
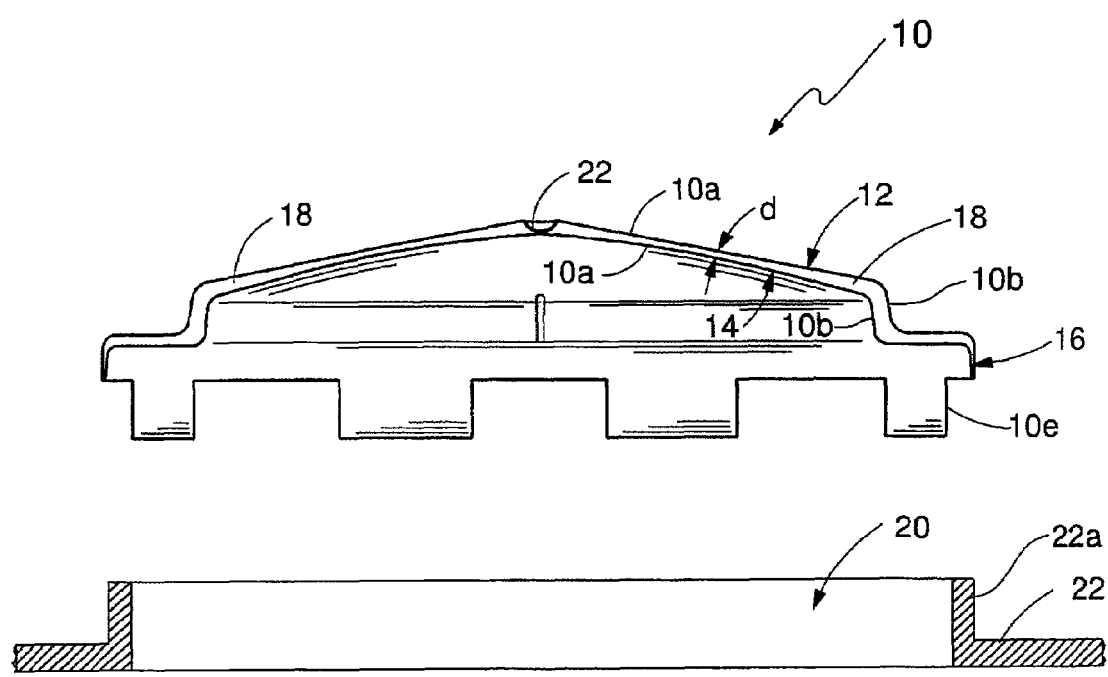
FIG. 4 is, in cross sectional view along line 4-4 in FIG. 2 and illustrating, in cross section, a vent onto which the vent cap is to be pivotally mounted.
Figure 5:
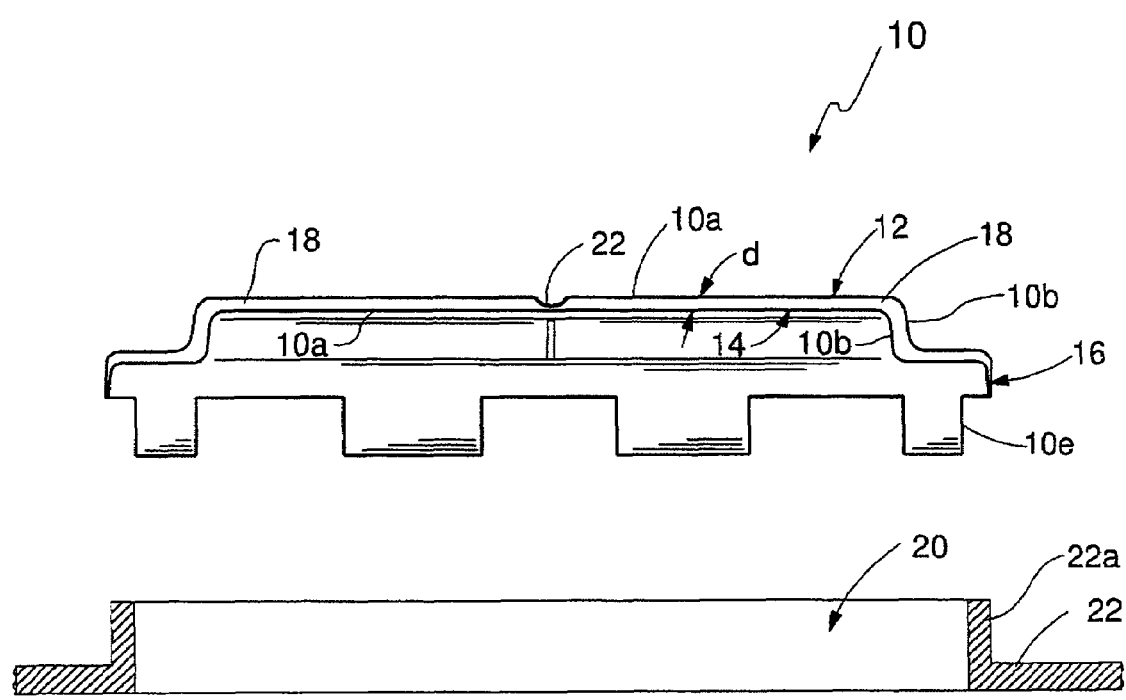
FIG. 5 is, in cross sectional view through the centroid of the vent cap and vent aperture, a further alternative embodiment of the vent cap according to the present invention.
Figure 6:
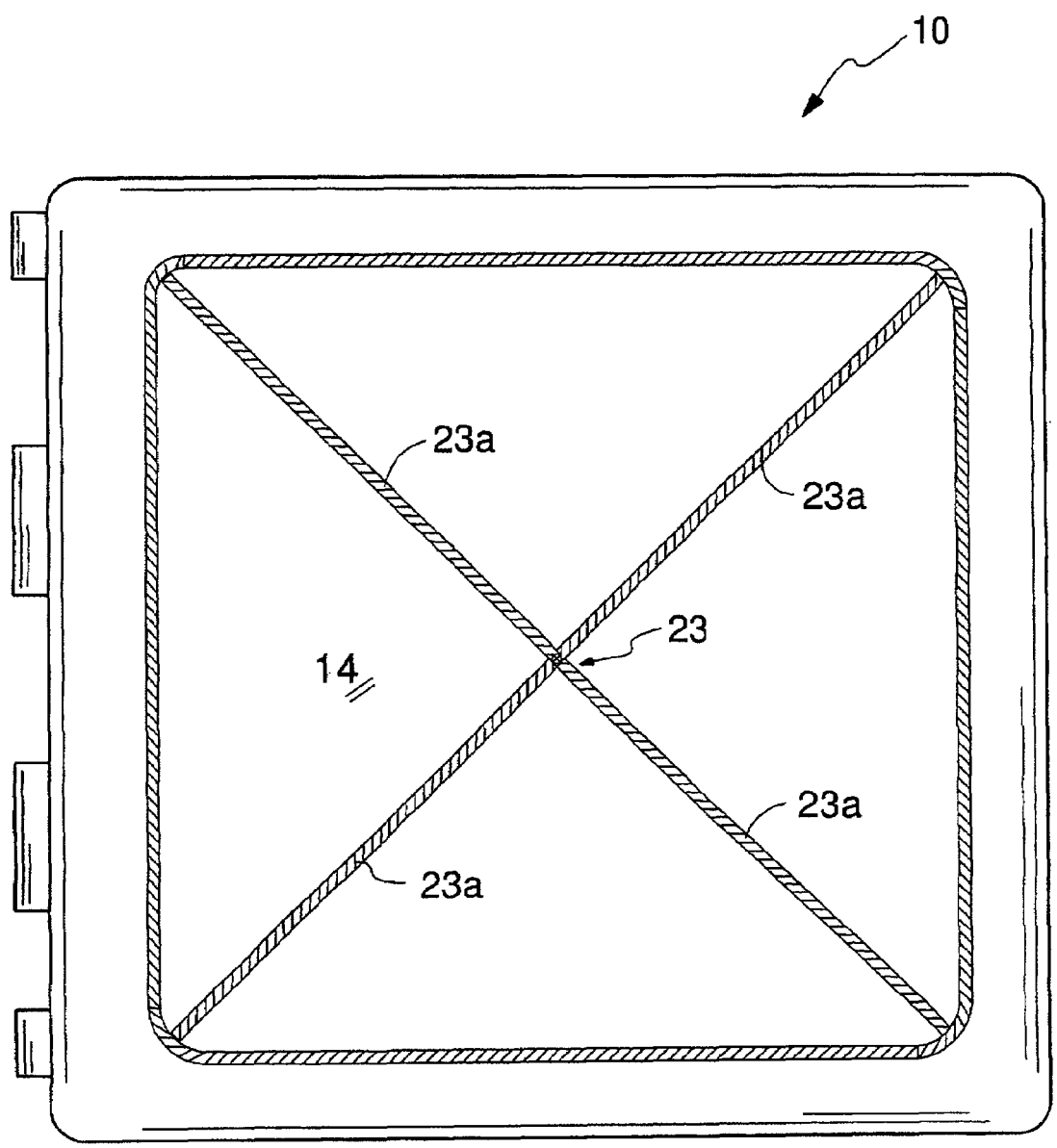
FIG. 6 is, in partially cut away plan view, an alternative embodiment of the vent cap of the present invention with the cover sheet partially cut away to expose a radially spaced apart array of spacer ribs mounted on the base sheet.

With reference to the drawings wherein similar characters of reference denote corresponding parts in each view, the insulated vent cap according to the present invention includes a cover member 10 comprising a cover sheet 12 mounted over a base sheet 14, both of which supported around their corresponding circumferential edges on a circumferential rim 16.

In one preferred embodiment, not intended to be limiting, cover sheet 12 and base sheet 14 are domed so as to be downwardly concave. In particular, each of cover sheet 12 and base sheet 14 includes an upper pyramid-shaped portion 10a mounted centred on so as to extend contiguously onto a riser portion 10b, the riser portion of each of cover sheet 12 and base sheet 14 themselves mounted on, and contiguously around rim 16. In one preferred embodiment not intended to be limiting, the circumferential edges of cover sheet 12 and base sheet 14 are coterminous at or adjacent rim 16, and in the illustrated embodiment are welded or otherwise formed integrally or adhered to one another so that the edges themselves of cover sheet 12 and base sheet 14 jointly form rim 16.

In the illustrated embodiments, an air space or void 18 is formed between cover sheet 12 and base sheet 14. In one embodiment not intended to be limiting cover sheet 12 and base sheet 14 are substantially parallel to one another by, for example the depth "d" of void 18 measured orthogonally between the base and cover sheets. Thus depth dimension d may be approximately constant so as to assist in cover member 10 providing a uniform degree of insulation over an air vent aperture 20 onto which cover member 10 is mounted. As in the prior art, cover member 10 may be mounted on hinges 10e so as to be hinged to one side or edge of air vent aperture 20. Thus cover member 10 may be selectively pivoted about hinges 10e. This is not intended to be limiting so long as cover member 10 may be raised to provide air flow through air vent aperture 20 when cover member 10 is elevated, and so as to provide an insulated seal over air vent aperture 20 when cover member 10 is selectively lowered into sealed engagement against the rigid surface 22 or lip 22a surrounding air vent aperture 20.

To provide efficient and cost effective insulation, the insulation in a preferred embodiment of cover member 10 is primarily due to void 18, wherein void 18 is a sealed, that is, airtight air space extending between cover sheet 12 and base sheet 14. Cover member 10 may be constructed of cost effective material, and the material of the base and cover sheets may be relatively thin so as to reduce the cost of manufacture and weight of the cover member, keeping in mind that in embodiments for use on recreational vehicles it is advantageous to try and reduce weight as much as possible. In applicant's experience, the air or gas trapped in the air tight void 18 between the base and cover sheets will, even if partially evacuated during manufacture, still expand and contract due to the change in outside ambient temperature normally associated with conventional use of recreational vehicles. That is, it is understood that the vent cap of the present invention will be used on recreational vehicles or in other applications wherein the vent cap is exposed to ambient temperatures ranging from below freezing to those high temperatures associated with desert climates so that a temperature range of fifty degrees Celsius may be anticipated. Consequently, in order to accommodate such a range of ambient temperatures to which cover member 10 will be exposed, even if void 18 is evacuated during manufacture of the vent cap, some gas will exist in void 18 which will expand and therefore will result in forces tending to balloon the base and cover sheets away from each other. This might result in structural damage, especially if the base and cover sheets are relatively thin, so that eventually cracking may be encountered, especially after many heating and cooling cycles, that is, expansion and contraction cycles. Thus it is advantageous to keep the amount of gas in void 18 to a minimum, or otherwise to minimize the amount of change in volume in void 18 due to expansion and contraction of the gas, the latter tending to cause void 18 to collapse. Should contraction of the gas in void 18 cause relative movement between the base and cover sheets so that the insulating distance d is reduced either more or less uniformly across cover member 10 or is reduced locally, this may tend to reduce the insulating benefit provided by void 18, and in particular where contraction of the gas in void 18 causes cover sheet 12 to come into contact with base sheet 14.

Consequently, applicant has found it advantageous to use at least one spacer such as for example spacers 22 or 23 to hold the relatively thin sheets or membranes of cover sheet 12 and base sheet 14 apart, thereby allowing for contraction of the air in void 18 without causing a corresponding substantial decrease in the spacing between the base and cover sheets.

Without intending to be limiting, spacer 22 is cup-shaped and may be integrally formed with either cover sheet 12 or with base sheet 14, thereby providing for ease of manufacture. Whether formed as an upwardly opening cup integral to cover sheet 12, or as a downwardly opening cup integral to base sheet 14, which again are by way of example only, spacer 22 should at least be formed to extend between and contact both the cover and base sheets medially positioned between rim 16. Thus, as illustrated, spacer 22 may be formed at the vertex of the pyramid portion 10a.

This is not intended to be limiting, as further spacers such as spacers 23 may be provided between the cover and base sheets 14, and need not be positioned exactly at the centroid of cover member 10 or exactly medially between rim 16 so long as the support is formed between the cover and base sheets to maintain for example dimension d of void 18. Further, the spacers need not necessarily be rigid, as somewhat resilient materials would also work although then the spacer may advantageously be of larger cross sectional area to provide the support to maintain a substantial portion of dimension d of void 18.

In further embodiments, spacers might for example include linear flanges such as radial ribs 23a extending for example along the lines of intersection 10c of sides 10d of pyramid portion 10a.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An insulated vent cap comprising:
   a cover member having a substantially rigid base sheet and a substantially rigid cover sheet and a circumferential rim extending around corresponding circumferential edges of said cover sheet said base sheet, wherein said base sheet is spaced apart from, and below, said cover sheet, to thereby define a sealed, air-tight insulating void therebetween,
   a spacer extending from said coversheet to said base sheet, whereby said cover and base sheets are maintained spaced apart, said spacer positioned so as to support said sheets at least substantially medially between said circumferential rim.

2. The device of claim 1 wherein said corresponding circumferential edges are coterminous substantially adjacent said circumferential rim.

3. The device of claim 1 wherein said spacer is rigid.

4. The device of claim 1 wherein at least said cover sheet is substantially domed.

5. The device of claim 4 wherein said cover sheet comprises a first domed surface and wherein said base sheet comprises a second domed surface, and wherein said first and second domed surfaces are substantially parallel to each other so that said void has a substantially constant dimension measured orthogonally between said cover and base sheets.

6. The device of claim 1 wherein said cover sheet is formed so as to include a substantially pyramid shape on and over said rim.

7. The device of claim 6 wherein said pyramid shape is centred over said rim.

8. The device of claim 7 wherein said pyramid is a right square pyramid.

9. The device of claim 5 wherein said cover sheet is substantially flat.

10. The device of claim 9 wherein said base sheet is substantially flat.

11. The device of claim 10 wherein said cover and base sheets are formed over and above said rim.

12. The device of claim 1 wherein said spacer is formed as a cup extending between said cover and base sheets.

13. The device of claim 4 wherein said spacer is formed as a cup extending between said cover and base sheets.

14. The device of claim 1 wherein said spacer is formed as at least one elongate member extending between said cover and base sheets.

15. The device of claim 12 wherein said cup is hollow and has an upwardly disposed opening into said cup.

16. The device of claim 13 wherein said cup is hollow and has an upwardly disposed opening into said cup.

17. The device of claim 14 wherein said at least one elongate member includes at least one radial arm extending radially outwardly from substantially a centroid of said cover and base sheets.

18. The device of claim 17 wherein said at least one elongate member is a radially spaced apart array of members radially spaced around said centroid.

19. The device of claim 1 wherein said spacer is formed as an integral part of said cover sheet.

20. The device of claim 1 wherein said spacer is formed as an integral part of said base sheet.

* * * * *